Sept. 7, 1926.
H. W. BUNDY
1,599,164
MACHINE FOR CUTTING AND FORMING METAL SHAPES
Filed Oct. 27, 1924
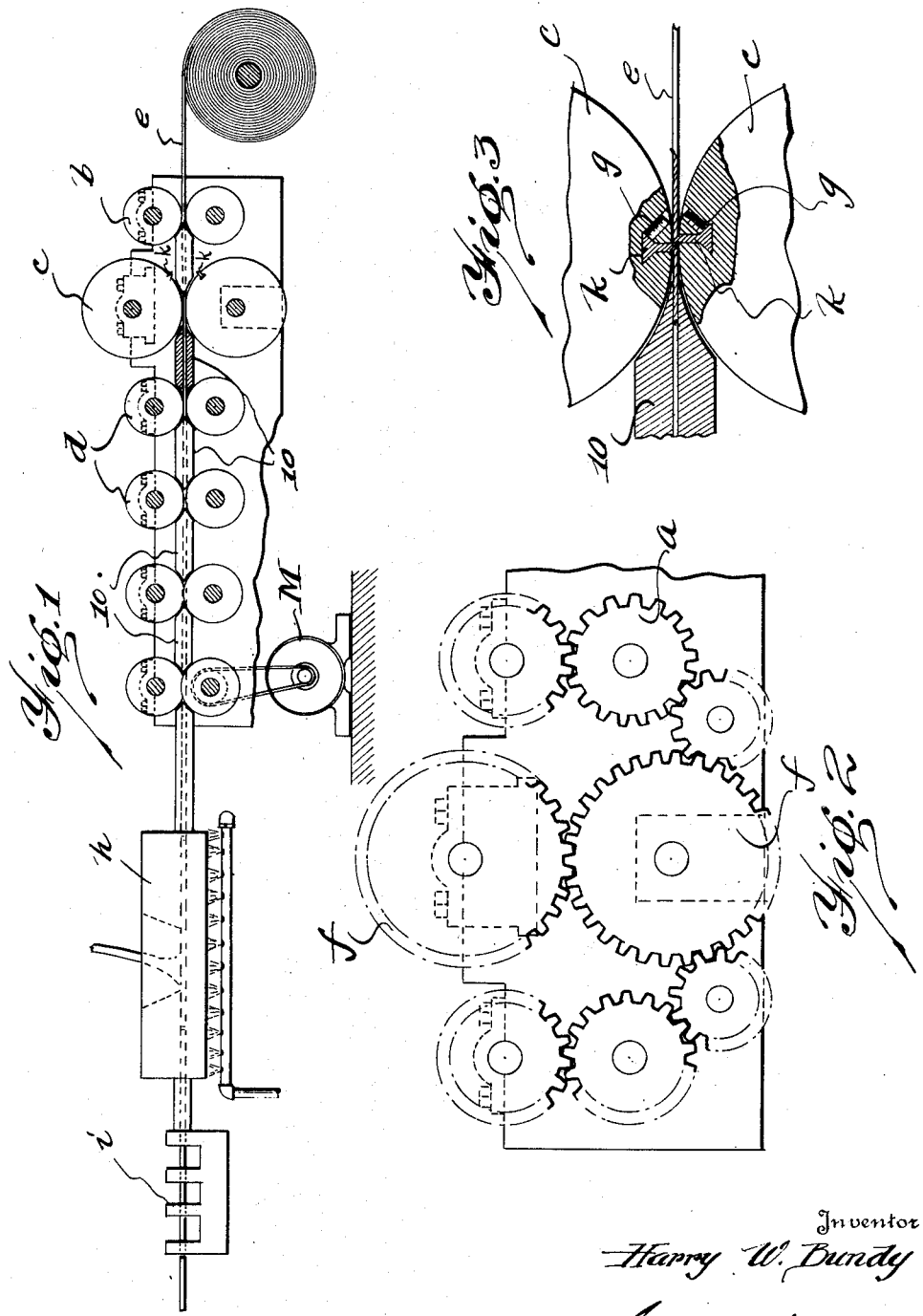
Inventor
Harry W. Bundy
By Stuart C. Barnes
Attorney

Patented Sept. 7, 1926.  1,599,164

UNITED STATES PATENT OFFICE.

HARRY W. BUNDY, OF DETROIT, MICHIGAN.

MACHINE FOR CUTTING AND FORMING METAL SHAPES.

Application filed October 27, 1924. Serial No. 746,029.

This invention relates to a metal cutting and shaping machine and has for its object the forming of predetermined lengths of metal shapes automatically.

When the metal is cut into certain lengths after it has been shaped, the sheared ends of the metal shapes are slightly distorted and they must be touched up with a file so that they can be used. The object of my present invention is to provide a machine that will cut and form metal shapes in any desired length without this added labor of touching up the ends afterwards.

To accomplish this, I cut the strip stock into lengths before it is formed into the metal shapes, and I do this while the same is continuously passing through the machine, thereby requiring only one handling of the material which is made into metal shapes of any desired length.

This machine is useful for forming tubing of any cross section channels, angles, weather-stripping, automobile sash channels and many other metal shapes.

In the drawings:—

Fig. 1 is an elevational view of the machine, somewhat diagrammatical.

Fig. 2 is a partial view of the reverse side of the machine, showing the means for connecting up the pusher, cutting, and forming rolls in driving relation.

Fig. 3 is a detail of a portion of the cutting rolls showing the cutter blades in the act of shearing the continuously traveling strip stock.

A motor M, or other source of power is connected up in a suitable manner with a train of gears $a$. Through this train of gears the pusher rolls $b$, cutting rolls $c$ and the tube forming rolls $d$ are positively driven. The strip stock $e$ of one continuous piece of metal is fed to the machine or initially fed to the cutting rolls $c$ by means of the pusher rolls $b$. The size of the gears $f$ and cutting rolls $c$ which rotate together on the same shaft, determine the length of the final product, the larger the gear and rolls $c$, the longer the length of the tube. Dovetailed into the peripheral face of each one of the cutting rolls is a cutter $k$, which is positioned transversely thereof, and a screw $g$ is adapted to be screwed down on the base of the cutter to secure the same in the cutting roll. As the cutting rolls rotate, the cutters will engage the continuously traveling strip stock once every revolution and will shear off the strip stock into predetermined lengths. Obviously shorter or varied lengths of stock could be made by providing more than one cutter, the circumferential distance between each cutter determining the length of stock which is cut off.

As shown in Fig. 1, it will be noticed that before a length of strip stock is severed, the forward end of the moving strip stock is passed through the guiding die 10 and caught up by the first forming roll, so that when the same is severed it may be moved through the forming rolls independently of the pusher rolls $b$, which serve only to feed the strip stock to the cutting rolls. Similar dies 10 are positioned between each pair of forming rolls for the purpose of guiding the short lengths of metal as they pass through the machine. After passing through the forming rolls, the metal shape is passed through the sweating die $h$, in which it is coated with a thin film of solder in a manner disclosed in my United States Patent No 1,476,796, wherein I show a tube coated with a film of solder. After passing through the sweating die the metal shape is pushed through the sizing dies $i$. From there they may be passed through any cooling apparatus and onto the delivery table in the usual manner.

To vary the length of the stock, it will probably be most practical to change the cutting rolls, the larger the roll the longer the piece of stock.

In the drawings I have shown one form of sweating die and sizing die, as in the particular machine in which we have incorporated the invention we are making a tube. However, tubes may be made in which the sweating die is not necessary, such as lock seam tubes. Also when utilizing the machine for forming some tubes and other metal shapes the sweating and sizing dies are not necessary and these elements need not be incorporated in the claims, but are merely shown for the purpose of illustrating one complete machine unit.

What I claim is:—

1. A device for making shaped articles from a strip of metal stock which comprises, means for drawing the metal from the stock with continuous movement, severing means for cutting the stock into predetermined lengths while the stock is moving, said severing means also advancing the severed lengths, and forming mechanism to which the severed lengths are advanced by the severing means, this forming mechanism operating to simultaneously shape and advance the severed lengths with continuous movement and finally ejecting the shaped articles.

2. A device for making shaped articles from a strip of metal stock which comprises, means for drawing the metal from the stock with continuous movement, severing means for cutting the stock into predetermined lengths while the stock is moving, a plurality of forming devices, these forming devices being arranged in a row and each device being adapted to act upon the severed lengths to shape the same and to advance them to the next succeeding forming device with continuous movement of the metal lengths, the severing means advancing each length of metal as it is severed to the first of the said forming devices.

3. A device for shaping articles from a strip of metal stock which comprises a pair of rollers for drawing the metal from the stock with continuous movement, a second pair of rollers to which the stock is advanced by the first mentioned rollers, this second pair of rollers being provided with severing means to sever the stock into predetermined lengths, a plurality of forming rolls arranged to successively act upon the severed lengths to shape the same, the severing rollers being adapted to advance the severed lengths to the first of the forming rolls and each of the forming rolls being adapted to advance the severed lengths to successive forming rolls as the lengths are shaped with continuous movement.

4. A device for shaping articles from a strip of metal stock which comprises a pair of rollers for drawing the metal from the stock with continuous movement, a second pair of rollers to which the stock is advanced by the first mentioned rollers, this second pair of rollers being provided with severing means to sever the stock into predetermined lengths, a plurality of forming rolls arranged to successively act upon the severed lengths to shape the same, the severing rollers being adapted to advance the severed lengths to the first of the forming rolls and each of the forming rolls being adapted to advance the severed lengths to successive forming rolls as the lengths are shaped with continuous movement, and a guide device between the forming rolls for guiding the lengths of metal as they are advanced.

In testimony whereof I have affixed my signature.

HARRY W. BUNDY.